June 25, 1940.    F. J. RAYBOULD    2,205,910

COUPLING COMPRESSION RING

Filed Nov. 3, 1938

INVENTOR
Frank J. Raybould

Patented June 25, 1940

2,205,910

UNITED STATES PATENT OFFICE 2,205,910

COUPLING COMPRESSION RING

Frank J. Raybould, Erie, Pa., assignor to Raybould Coupling Company, Meadville, Pa., a corporation of Pennsylvania Application November 3, 1938, Serial No. 238,570

4 Claims. (Cl. 288—19)

The present invention relates to couplings for joining together two pipe members or the like without the use of threads thereon or any other direct interlocking of parts carried by the members to be joined together. More particularly, it relates to compression rings for use in such couplings and to the manufacture thereof.

In my prior Patents Nos. 1,955,831 and 1,955,832, and in my applications Serial Nos. 112,727 and 112,728, now Patents Nos. 2,148,038 and 2,163,810, respectively, issued Feb. 21, 1939, and June 27, 1939, I have shown and described various types of couplings of the threadless type embodying one or more compression rings of the general character of those to which the present invention relates. Reference is hereby made to my prior patents and applications for a more complete description of couplings of this general character. In all of said couplings a compression ring is employed for effecting the connection between an inner and an outer member, the compression ring being positioned circumferentially of the inner member and the coupling being arranged to exert axial pressure upon the compression ring for the purpose of expanding it radially into tight engagement with the inner and outer members.

In couplings of this character it is highly desirable to arrange the parts forming the coupling in such a manner as to prevent any of the resilient material of which the compression ring is formed from being extruded from the confined space between the inner and outer members in which it is located. Pipe diameters vary materially and consequently the coupling to be used for any given size of pipe must be of such character as to take care of both minimum and maximum diameter pipe. It will therefore be apparent that where the one pipe to be joined to another is just within the upper tolerance and the other pipe is just within the lower tolerance limit, there will be a substantial area through which the compression ring may be extruded when subjected to pressure for effecting the joint. As shown in my prior patents and applications, this problem of preventing the extrusion of the resilient compression ring has been solved by the provision of metallic bushings extending angularly about any of the free edges of the compression ring where there is any chance of the material being extruded through the free clearances.

In the manufacture of couplings of the character described above, the metallic bushings and the compression rings may be made separately or the metallic bushings may be first made and the compression ring formed in a permanent multiple mold which at the same time vulcanizes the rubber to the metallic bushing. It will be apparent that any compression ring over 12 inches in diameter requires a very large mold to produce at the most four of such compression rings at a time. Consequently such compression rings which are in excess of 24 inches in diameter can only be produced in a single mold and this operation is extremely costly from both the standpoint of equipment and direct production charges. So far as I am aware it has not been considered commercially feasible to produce such compression rings heretofore in sizes over 30 inches in diameter.

In accordance with the present invention I provide a compression ring which can be produced very economically in either large or small sizes and which is of such character as to preclude extrusion of the compression ring from the confined space between the inner and outer members being joined together. The method which I provide by the present invention for the manufacture of such rings is relatively simple and of such character that large compression rings can be commercially produced and smaller compression rings can be more economically produced than by the presently known methods of manufacture.

In the accompanying drawing I have shown for purposes of illustration only several forms which the compression ring of the present invention may assume. In the drawing—

Figure 1:
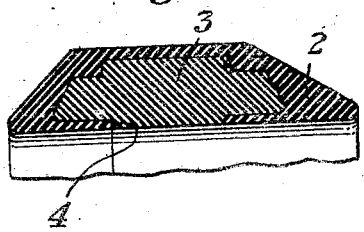
Figure 1 is a sectional view through one form of compression ring.

As shown in the drawing the compression ring which I provide consists of an outer tube or case 2 and an inner core 3. The outer case or tube may be of any desired form or shape. It may be round or in the form of an irregular polygon. This outer case or tube is formed from either rubber or a plastic material and is sufficiently hard to resist extrusion through the free clearance between the pipe wall and the outer member.

The inner core 3 is formed of relatively soft resilient rubber or other like material; that is, a material which is capable of expanding in one direction when subjected to compression forces exerted in a different direction. I have found that an entirely satisfactory compression ring can be formed of rubber. The outer section or tube 2 may be formed of rubber having a durometer test of 85 and the inner core or section may be formed of rubber having a durometer test of 60.

In the embodiment shown in Figure 1 the outer tube or casing substantially encases the inner core except for a small area or opening 4 which is provided in one face thereof for the insertion of the inner core and for the purpose of permitting relative movement of the two ends of the ring toward each other.

Figure 2:
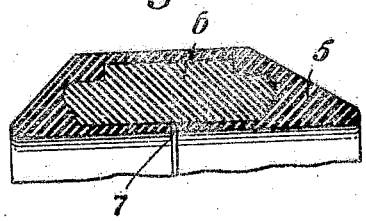
Figure 2 is a sectional view of another form of ring which I provide.

In the embodiment shown in Figure 2 the outer tube or case 5 is formed of a hard material which will resist extrusion through the free clearances and the inner core 6 is formed of a relatively soft resilient material. This embodiment differs from that shown in Figure 1 in general configuration and in that the opening 7 corresponding with the opening 4 is substantially smaller.

Figure 3:
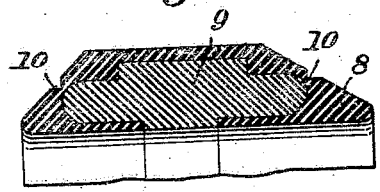
Figure 3 is a section through a still further embodiment of my invention.

In the embodiment shown in Figure 3 the outer casing or tube 8 is formed of a relatively hard material and the inner core 9 is formed of relatively soft material. In general the embodiment shown in Figure 3 is similar to that shown in Figure 1 except that the outer tube or case is provided with notches 10 providing a restricted portion between the upper and lower portions thereof. These notches 10 are provided so as to permit the outer tube to break when subjected to substantially axial compression forces.

Figure 4:
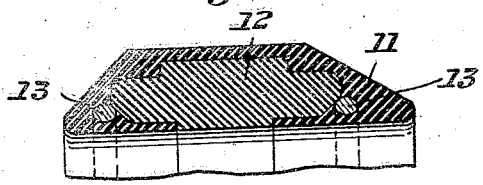
Figure 4 is a section through a still further embodiment of my invention.

The embodiment shown in Figure 4 is similar to the embodiment shown in Figure 1. The outer tube or case 11 is likewise formed of relatively hard material and the inner core 12 is formed of relatively soft material. In this embodiment metallic reinforcing rings 13 are provided for reinforcing the ring.

Figure 5:
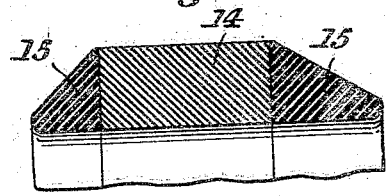
Figure 5 is a section through another embodiment of my invention.

In the embodiment shown in Figure 5 the central portion 14 is formed of resilient material and the tip portions 15 are formed of a relatively hard material which will prevent extrusion through the free clearances. This embodiment differs from the other embodiments referred to above in that the portion which is formed of the hard rubber material does not extend over either the upper or bottom surface of the inner portion 14.

In accordance with the present invention I form the compression rings described above by the tubing or extrusion method. The outer tube or case may be tubed or extruded in a long piece and then cured. The inner portion or core may be extruded in one piece and then cured. Thereafter the core may be inserted in the outer tube so as to form the complete compression ring.

Instead of completely curing both portions of the compression ring separately, the hard rubber tube may be extruded and then only partially cured. The crude rubber core may then be inserted in the outer tube and the curing of both completed together.

The compression ring described above may also be formed by any suitable combination of molding and extruding operations. For example, the inner section 14 of the embodiment shown in Figure 5 may be extruded and the hard outer portions 15 may be molded and the two parts vulcanized or otherwise united together. In addition the entire embodiment shown in Figure 5 could be molded with the outer ends of hard rubber or other hard material and the inner portion of soft rubber or other resilient material.

Where the inner and outer portions are made by the extrusion or tubing method the parts are cut to required length to meet the necessary pipe diameter and thereafter the ends are vulcanized together or left free, depending upon the particular type of installation to which they are being applied.

It will be obvious that in accordance with the above methods the middle rings which I provide may be made of any size and any suitable configuration. It will also be obvious to those skilled in this art that since the rings which I provide can be made either partly or entirely by the tubing or extrusion method appreciable savings in factory cost will be effected and that a further saving will be effected in the elimination of costly tools. Other advantages of a similar nature will be also readily apparent to those skilled in the art.

While I have shown and described various different embodiments of my invention it will be understood that I do not intend to be limited thereto and that my invention may be otherwise embodied and practiced within the scope of the appended claims.

I claim:

1. A coupling compression ring comprising an inner core of a relatively soft resilient material and an outer casing of a relatively hard material, said casing having at least one section appreciably thinner than the remainder thereof to permit breaking of the casing at the thin section when subjected to substantial coupling pressures.

2. A coupling compression ring comprising an annular ring of a relatively soft resilient material and an annular outer casing of a relatively hard material extending around the edges of said ring, said outer casing having at least one section thinner than the balance thereof, whereby the hard outer casing will break along said thin section when subjected to substantial coupling pressures.

3. A coupling compression ring comprising an annular inner ring of a relatively soft resilient material and an annular outer casing of a relatively hard material capable of resisting extrusion through the free clearances when the ring is embodied in a coupling, said outer casing having a bottom portion and sides extending upwardly at an angle from the bottom portion substantially enclosing the inner ring and having at least one relatively thin section extending peripherally around said ring along a side thereof, whereby the outer casing will break along said thin section when the ring is subjected to axial coupling pressures.

4. A coupling compression ring comprising an annular inner ring of a relatively soft resilient material and an annular outer casing of a relatively hard material capable of resisting extrusion through the free clearances when the ring is embodied in a coupling, said outer casing having a bottom portion and sides extending upwardly at an angle from the bottom portion substantially enclosing the inner ring and having at least one relatively thin section extending peripherally around said ring along a side thereof, whereby the outer casing will break along said thin section when the ring is subjected to axial pressures and the relatively soft inner ring will be permitted to flow through the opening caused by said breaking of the outer ring, said outer casing also having a peripheral opening in the bottom or inner face thereof whereby said relatively soft inner ring will be permitted to flow from the outer casing when the ring is subjected to coupling pressures.

FRANK J. RAYBOULD.